United States Patent
Boshuizen

(10) Patent No.: US 8,221,039 B2
(45) Date of Patent: Jul. 17, 2012

(54) BOAT LATCH

(76) Inventor: Trevor Wayne Boshuizen, Hasting (AU)

( * ) Notice: Subject to any disclaimer, the term of this patent is extended or adjusted under 35 U.S.C. 154(b) by 112 days.

(21) Appl. No.: 12/832,626

(22) Filed: Jul. 8, 2010

(65) Prior Publication Data

US 2011/0008123 A1 Jan. 13, 2011

(30) Foreign Application Priority Data

Jul. 10, 2009 (AU) .................. 2009903284

(51) Int. Cl.
*B60P 3/10* (2006.01)

(52) U.S. Cl. ............................................... 410/69

(58) Field of Classification Search ............ 410/2, 3, 410/7, 69, 77, 80, 81; 280/414.1, 508, 510; 114/344; 414/536; 292/121, 128, 163, 335
See application file for complete search history.

(56) References Cited

U.S. PATENT DOCUMENTS

| | | | | |
|---|---|---|---|---|
| 4,623,161 A * | 11/1986 | Sprague | ..................... | 280/414.1 |
| 4,641,851 A * | 2/1987 | Knies | ......................... | 280/414.1 |
| 4,826,200 A * | 5/1989 | Tingley | ...................... | 280/414.1 |
| 4,919,446 A * | 4/1990 | Higgins | ..................... | 280/414.1 |
| 5,013,206 A * | 5/1991 | Ernst et al. | .................... | 414/483 |
| 5,120,079 A * | 6/1992 | Boggs | ......................... | 280/414.1 |
| 5,263,733 A * | 11/1993 | Kastenberger et al. | .... | 280/414.1 |
| 5,599,035 A * | 2/1997 | Spence | ...................... | 280/414.1 |
| 5,895,185 A * | 4/1999 | Spence | ........................... | 410/77 |
| 6,402,445 B1 * | 6/2002 | Smiley | ............................. | 410/77 |
| 2008/0265543 A1 * | 10/2008 | Davis et al. | ................. | 280/414.1 |
| 2011/0133429 A1 * | 6/2011 | Caudill | ..................... | 280/414.1 |
| 2011/0236126 A1 * | 9/2011 | Eliot, Jr. | ........................ | 403/326 |

* cited by examiner

*Primary Examiner* — H Gutman
(74) *Attorney, Agent, or Firm* — Sand & Sebolt

(57) ABSTRACT

Latching device (50) for latching thereto a boat coupling part (24) of a boat (10) on a body of water (28) by moving the boat up a ramp. Latching device (50) has a latching element (54) mounted for pivotal movement such that it is engaged by said boat coupling part (24) when the boat is moved up the incline, to pivot the latching element (54) to a position at which the boat coupling part (24) can pass a catch part (85) of the latching element (54). After passage of the boat coupling part (24) past the catch part (85), the latching element (54) reversely pivots to allow capture of said boat coupling part (24) by said catch part (85), under reverse movement of the boat (10).

6 Claims, 7 Drawing Sheets

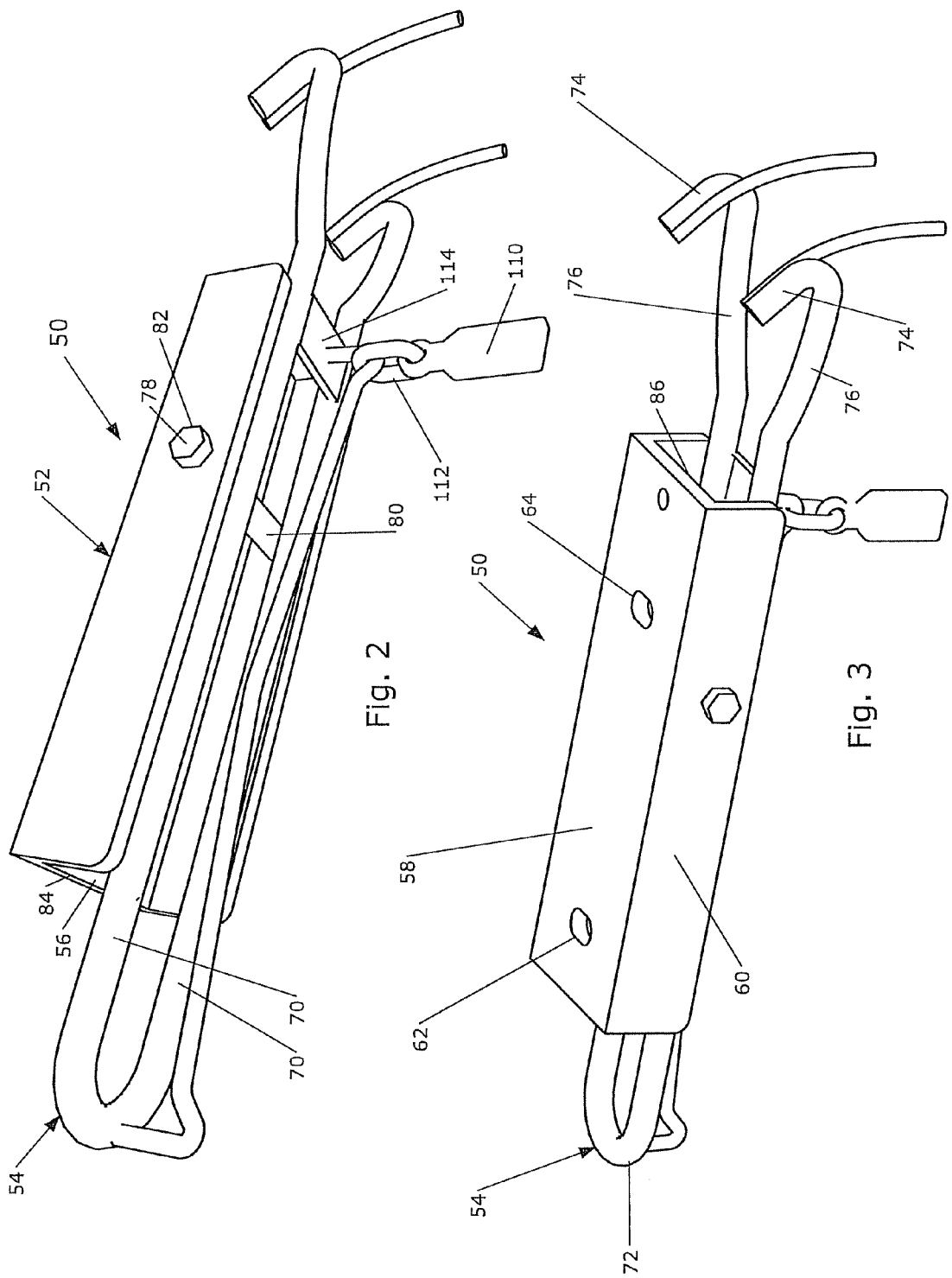

BOAT LATCH

CROSS REFERENCE TO RELATED APPLICATION

This application claims priority from Australian Application No. AU 2009903284 filed Jul. 10, 2009; the disclosure of which is incorporated herein by reference.

FIELD OF THE INVENTION

This invention relates to a boat latch for latching a boat to a trailer.

BACKGROUND TO THE INVENTION

Boats carried by trailers may be launched in a body of water by moving the trailer onto an inclined ramp which extends downwardly into the body of water, and then sliding the boat off of the then inclined trailer onto the body of water. Similarly, the boat may be recovered from the body of water, with the trailer positioned on the ramp, by driving the boat onto the trailer, and then removing the boat and the trailer so carried by the trailer from the body of water by withdrawal up the ramp.

During the recovery operation, a decouplable retaining means is employed to prevent the boat sliding off of the inclined trailer when the trailer is removed. This may also be used for purposes of retention of the boat on the trailer during transport. The retaining means may be in the form of a flexible rope, chain, strap or the like that is releasably couplable to the boat and to a fixed part of the trailer. Commonly, the link is a strap which can be wound on and off a rotatable drum of a winch attached to the trailer at the forward end of the trailer, which end is at a relatively high location when the trailer is positioned on the boat ramp for recovery of the boat. Then, the recovery procedure involves driving the boat up the partly submerged trailer until a forward end of the boat is adjacent to the winch, attaching the strap, and then winding the strap onto the winch drum by operation of the winch until any slack in the strap is taken up. Alternatively, the boat may be maneuvered to a location close to the trailer, and the winch used to pull the boat onto the trailer.

In either event, after securing the boat, the trailer can be moved up the ramp, e.g. by towing with a suitable attached vehicle, so that the boat is pulled on the trailer from the body of water, with the winch strap preventing the boat from sliding rearwardly off of the trailer during that operation. With a boat so retained on a trailer, the boat may be launched by backing the towing vehicle so that the trailer passes down an inclined boat ramp until at least the lower part of the rear end of the boat enters the body of water, releasing the boat from the winch strap and then moving the boat off of the ramp and onto the body of water, by sliding the boat off of the trailer, possibly by operation of a motor of the boat to effect reverse movement of the boat.

Retrieval of a boat in the above described way may involve that a boat crewman get off of the boat to connect the winch strap and operate the winch. In so doing, and before the boat is properly tethered to the trailer, there is risk the boat may float off of the trailer, and if there is no other crewman on board, retrieval may be difficult or even impossible.

There needs to be a simple means to tether a boat to a trailer that can be attached and released without manual intervention to allow a solitary person to launch and recover a boat whilst remaining in the boat thus avoiding the danger of the boat floating away unmanned.

The object of the invention is to overcome the above problem or at least provide the public with a useful alternative.

SUMMARY OF THE INVENTION

According to the present invention, there is provided a latching device for latching a boat to a trailer, by coupling to a part of the boat, the latching device having a movable latching element with a catch part, and biasing means operable to bias the latching element towards a first position, the latching element having a cam surface which, under engagement by forward movement of said boat coupling part thereagainst, is displaced from said first position, to a second position permitting the boat coupling part to pass the catch part to be located at an unlatched location, whereafter which the biasing means biases the latching element back towards said first position, for latching of the boat coupling part by the catch part under reverse movement of the boat part.

The biasing means may be operable to bias the latching element to said second position, whereby the boat, when latched to the trailer, can be released by movement of the boat to move said boat coupling part past said catch part, to said unlatched location, at which the biasing means moves the latching element to the second position to permit the boat coupling part to be freed from the latching element by reverse movement of the boat part. The latching device may have a mounting part for attachment to said trailer, and said latching element being pivotally mounted thereto.

The biasing means may be a weight, movably positionable on the latching element at respective locations for selectively biasing the latching element at least to the first position, and to the second position under gravitational influence.

The latching element may have a slide the weight being slidably movable along the slide to said locations.

The first and second positions may be at opposite sides of a pivot axis of the latching element such that when the weight is positioned at one of said locations, it is biased for clockwise pivotal movement about said axis and, when at the other of said locations, it is biased for anticlockwise pivotal movement about said axis.

The catch part may be in the form of a hook formation, for capturing a laterally extending cross-piece of said boat coupling part.

The invention also provides, in combination, the latching device of the invention and a boat coupling part attachable to a boat.

The boat coupling part may be securable to said boat at a forward end of the boat.

The coupling part may be attached to said boat to form said boat part.

BRIEF DESCRIPTION OF THE DRAWINGS

The invention is further described by way of example only with reference to the accompanying drawings in which:

FIG. 2 is an underside perspective view of a latching device formed in accordance with the invention and fitted to the trailer of FIG. 1 for latching the boat to the trailer;

FIG. 3 is a topside perspective view of the latching device of FIG. 2;

LIST OF COMPONENTS

Figure 1:
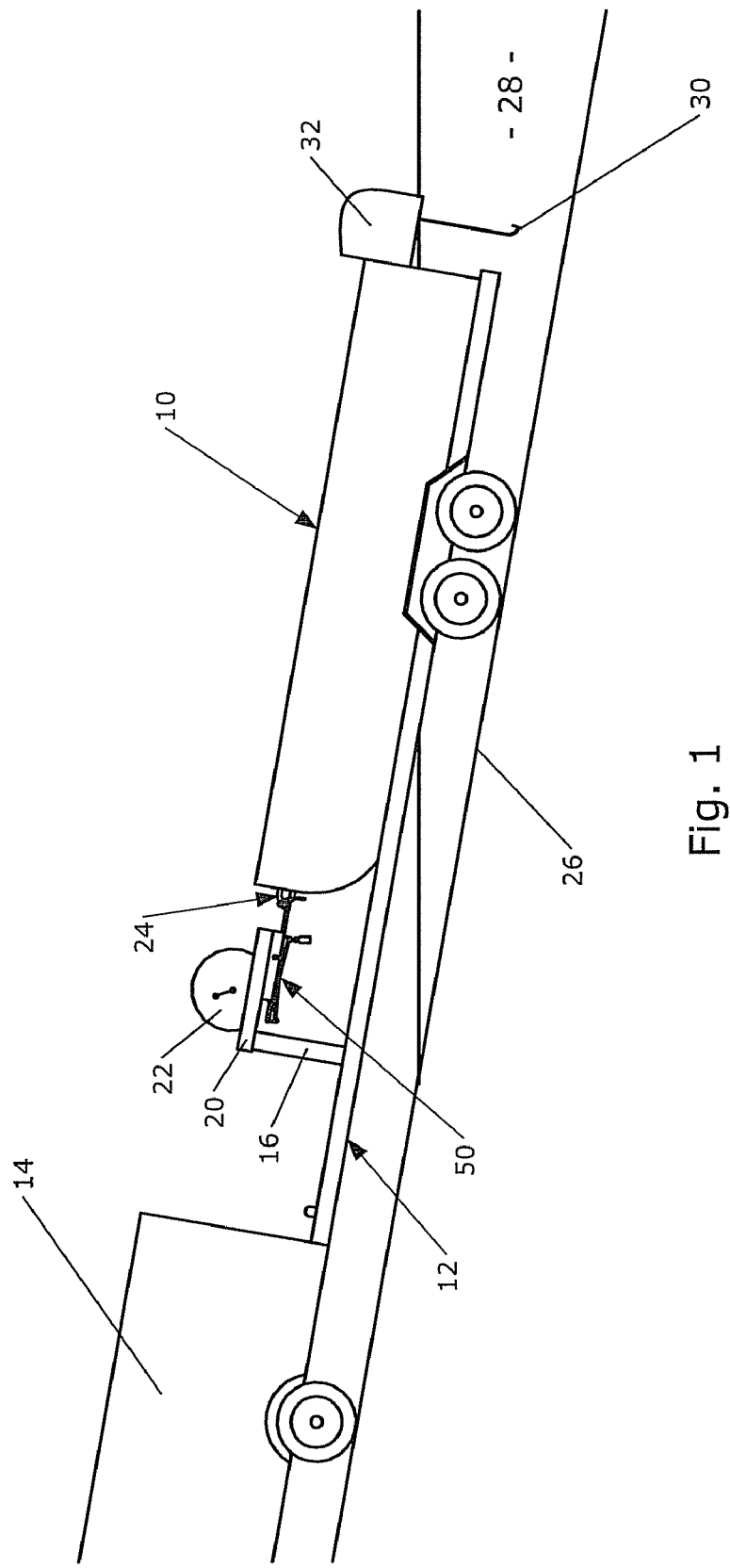
FIG. 1 is a side view of a boat on a trailer attached to a vehicle, the trailer being positioned on a ramp for launching the boat onto a body of water.

10 boat
12 trailer
14 vehicle
16 post
18 forward end (of trailer 12)
20 mounting element
22 winch
24 boat coupling part (first embodiment)
24*a* boat coupling part (second embodiment)
26 ramp
28 body of water
30 propeller
32 boat motor
34 biasing means
50 latching device
52 mounting part
54 movable latching element
56 channel member
58 web portion
60 flanges
62, 64 openings
70 leg portions
72 end portions
74 latching portions
76 end parts
78 pivot axis
80 bearing element
82 bolt
84 forward transverse edge (of web portion 58)
85 catch part
86 rear transverse edge (of web portion 58)
88 hook formations
90, 92 positions of axes of the leg portions 70
94 lower parts (of latching portions 74)
96 upper parts (of latching portions 74)
98 cam surfaces
100 slide
102 first hook portion
104 second hook portion
106, 108 intermediate part
110 weight
112 ring part
114 cross-bracket
120, 120*a* U-shaped member
122, 122*a* threaded legs
124, 124*a* intermediate part
126, 126*a* cross-piece
128 front mounting plate
130 front wall (of boat 10)
132 rear mounting plate
134 nuts
136, 136*a* steps
140 boat coupling part body
142 cross piece carriage
144 grub screws

DETAILED DESCRIPTION OF PREFERRED EMBODIMENT

FIG. 1 shows a boat 10 positioned on a trailer 12, hitched to the rear of a vehicle 14. The trailer has an upstanding post 16 at a forward end 18 of the boat. The post 16 has a forward to rearwards extending mounting element 20 in the form of a plate, beam or the like. A winch 22 is positioned on the mounting element. It has a crank handle, by which a flexible strap may be payed out or wound onto an internal drum, so that, by attaching a free end of the strap to the front of the boat the winch can be operated to wind in the strap until it is tensioned, to hold the boat against sliding off of the trailer. While the winch may be so operated, it is not necessary to use the winch in the present instance, because the trailer is equipped with an alternative holding means in the form of a latching device 50 attached to the underside of the mounting element 20, and which is effective to latch to a co-operating boat coupling part 24.

The boat 10, trailer 12 and vehicle 14 are shown in FIG. 1 in a condition where the boat is held on the trailer by the latching device 50, preparatory to launch of the boat by sliding it rearwardly off of the trailer. Particularly, the trailer is shown as being positioned, by reversing the vehicle down a sloping launch ramp 26, so that the trailer and boat are inclined, with the rear part of the boat positioned partially in a body of water 28 onto which the boat is to be launched.

Particularly, a rear propeller 30 of the boat 10, operable by a boat motor 32, is within the body of water 28, but the boat is held from sliding off of the now sloping trailer 12 by the latching device 50.

Figure 4:
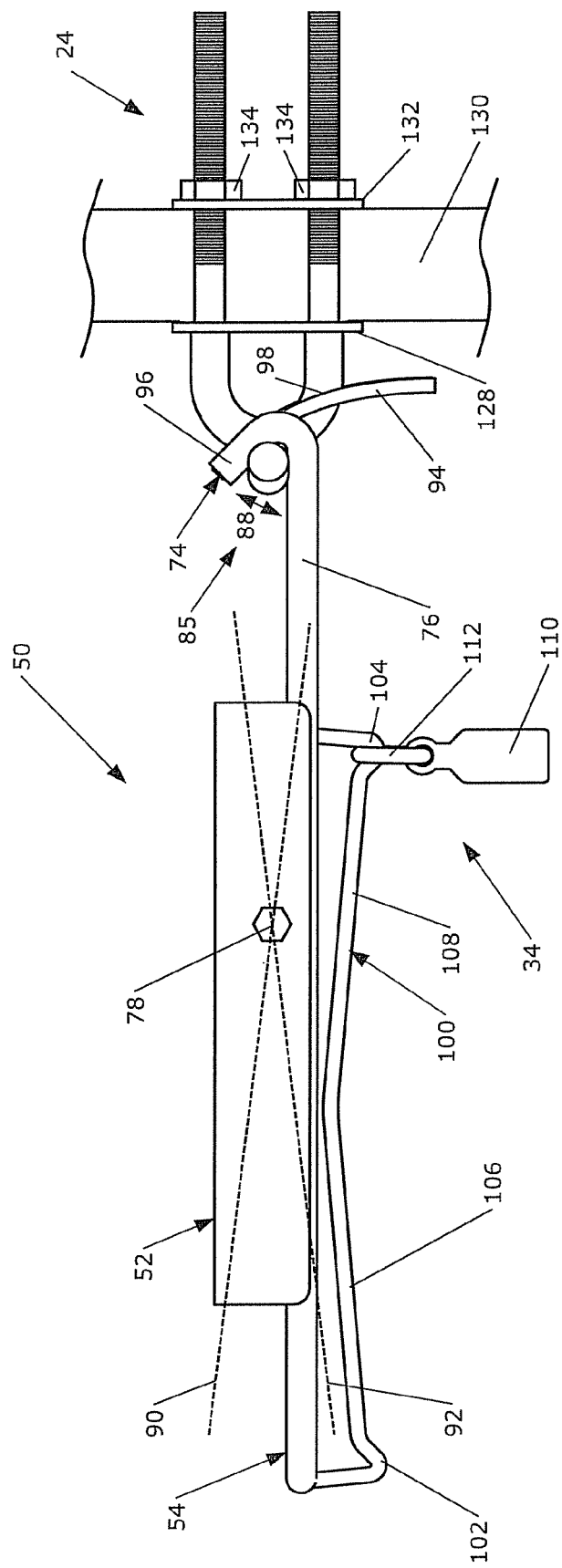
FIG. 4 is a side view of the latching device of FIG. 2.

Referring to FIGS. 2 to 4, the latching device 50 is formed in two parts, a mounting part 52, and a movable latching element 54, pivotally secured to the mounting part.

The mounting part 52 of the latching device 50 is in the form of an elongate channel member 56 having a web portion 58 and depending flanges 60 at either side edge thereof. Web portion 58 has openings 62, 64 to permit mounting part 52 to be bolted in position on the underside of the mounting element 20 by for example passing the shanks of upwardly extending bolts (not shown) through these into threaded openings in the underside of the mounting element and screwing these up so as to securely press and hold the web portion against the underside of the mounting element. As shown, mounting part 52 then extends in the longitudinal direction of the trailer 12.

The latching element 54 is of elongate generally U-shaped form, being formed from metal rod, so as to present spaced parallel leg portions 70 joined by a semicircular end portion 72. At the opposite ends of leg portions 70 are end parts 76 that diverge outwardly and join to respective latching portions 74 formed from short portions of metal rod.

A tubular bearing element 80 (FIG. 2) is secured such as by welding to the leg portions 70, so as to extend transversely between the leg portions at a location about midway along the lengths of the leg portions. The latching element 54 is secured to mounting part 52 by means of a bolt 82 which passes through transversely aligned openings (not shown) in the flanges 60 of the mounting part and through the tubular bearing element 80, so that the latching element is pivotal about a pivot axis 78, being the axis of the bolt, over a range of angular movement with respect to the mounting part. The pivot axis 78 is transverse to the trailer 12 when the latching device 50 is positioned on the trailer. Bolt 82 has a nut (not shown) threadedly retained thereon, so that the nut and the head of the bolt are disposed at opposed outer sides of the flanges 60, for purposes of retention of the bolt.

In the condition of attachment of the latching device 50 to the underside of mounting element 20, latching element 54 is below web portion 58 and between the flanges 60 of mounting part 52. FIG. 4 shows mounting part 52 and latching element 54 in generally horizontal intermediate positions. From its horizontal position, latching element 54 may be pivoted anticlockwise relative to mounting part 52 and about the pivot axis 78 so that the latching portions 74 rises. This movement is limited by engagement of the leg portions 70 with a rear transverse edge 86 (FIG. 3) of web portion 58 of mounting part 52, the rear end of the latching element 54 then assumes a raised position. Under clockwise rotation of the latching element 54, pivotal movement is limited to a position at which the latching element 54 engages a forward transverse edge 84 of web portion 58. Then, the forward end of the latching element 54 assumes a raised condition. In FIG. 4, reference numerals 90, 92 denote the positions of the axes of the leg portions 70 at the respective clockwise and anticlockwise extremes of permitted pivotal movement.

The range of permitted pivotal movement in the clockwise and anticlockwise directions is generally chosen to permit latching and unlatching operation as described later with respect to FIGS. 7 to 9 but, generally permitting clockwise and anticlockwise movements of about 10 degrees each from the shown intermediate position may be suitable.

The latching portions 74 are arranged in respective spaced upright parallel planes that are transverse to the common plane containing the lengthwise axes of the leg portions 70. Each latching portion 74 is curved to as to extend, from a lower end, upwardly and forwardly, in the horizontal position of the latching element 54. Lower parts 94 of the latching portions 74 extend downwardly from locations at which they join the end parts 76 of leg portions 70, and upper parts 96 thereof extend upwardly from the lower parts, and from locations where the upper and lower parts join the end parts of the leg portions. The latching portions 74 present rear smoothly curved cam surfaces 98 (FIG. 4) which preferably and continuously extend upwardly and forwardly from the lower ends of the latching portions to the upper ends thereof, at least in the position where the axes of the leg portions assume the position shown by reference numeral 92. The upper parts 96 of latching portions 74 also define, with the respective adjacent and co-joined end parts 76 of the latching portions, respective catch parts 85, formed as forwardly open hook formations 88.

Latching element 54 has a slide 100 in the form of a length of rod secured at a forward end, as by welding, to the end portion 72 of the latching element, and at a rear end to cross bracket 114 secured as by welding to leg portions 70 of the latching element so as to extend transversely between forwards and rearwards ends of the latching element, somewhat before end parts 76 however. Slide 100 is centrally positioned with respect to leg portions 70, but somewhat below them. It defines at a forward end a first upwardly open hook portion 102 and, at the rear end, a second upwardly open hook portion 104. The hook portions 102, 104 are interconnected by intermediate parts 106, 108 of the slide 100, which smoothly join with the inner legs of the respective hook portions and which extend linearly therefrom towards each other and somewhat upwardly to meet at an apex about midway between the hook portions.

The latching device 50 has a biasing means 34 for pivotally biasing the latching element 54 selectively in clockwise and anticlockwise directions. Biasing means 34 is formed by a small weight 110 carried on the slide 100, this being mounted thereto for sliding movement along the slide by a ring part 112 which passes loosely through an opening in the weight and loosely encloses the cross-section of the slide. The weight 110 may thus be slid along the slide 100 to and between a rear position (shown in FIG. 4) where it rests in hook portion 104 and a forward position at which it rests in hook portion 102. In the forward position, absent other constraints on the latching element 54, the weight 110 causes the latching element to pivot in the anticlockwise direction so that the axes of leg portions 70 assume the condition indicated by reference numeral 92 in FIG. 4. In the rear position, absent other constraints on the latching element 54, the weight 110 causes the latching element 54 to pivot in the clockwise direction so that the axes of leg portions 70 assume the condition indicated by reference numeral 90 in FIG. 4.

Figure 5:
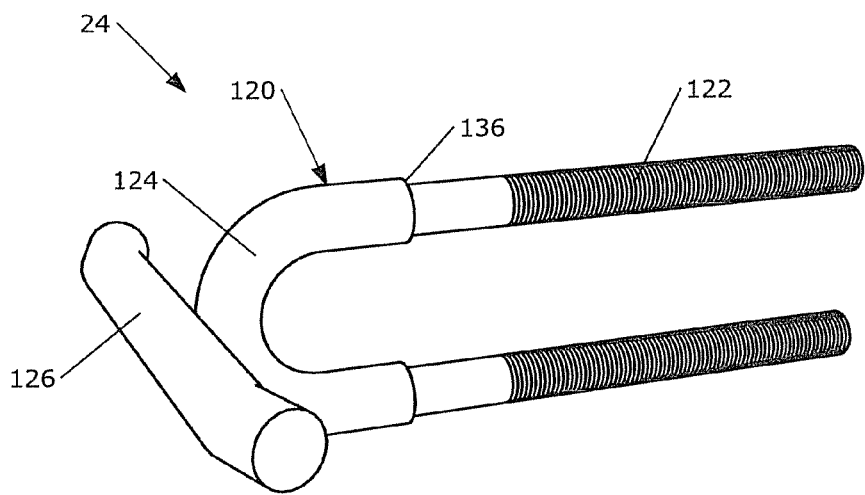
FIG. 5 is a perspective view of a boat coupling part according to a first embodiment useful with the latching device of the invention.
Figure 6:
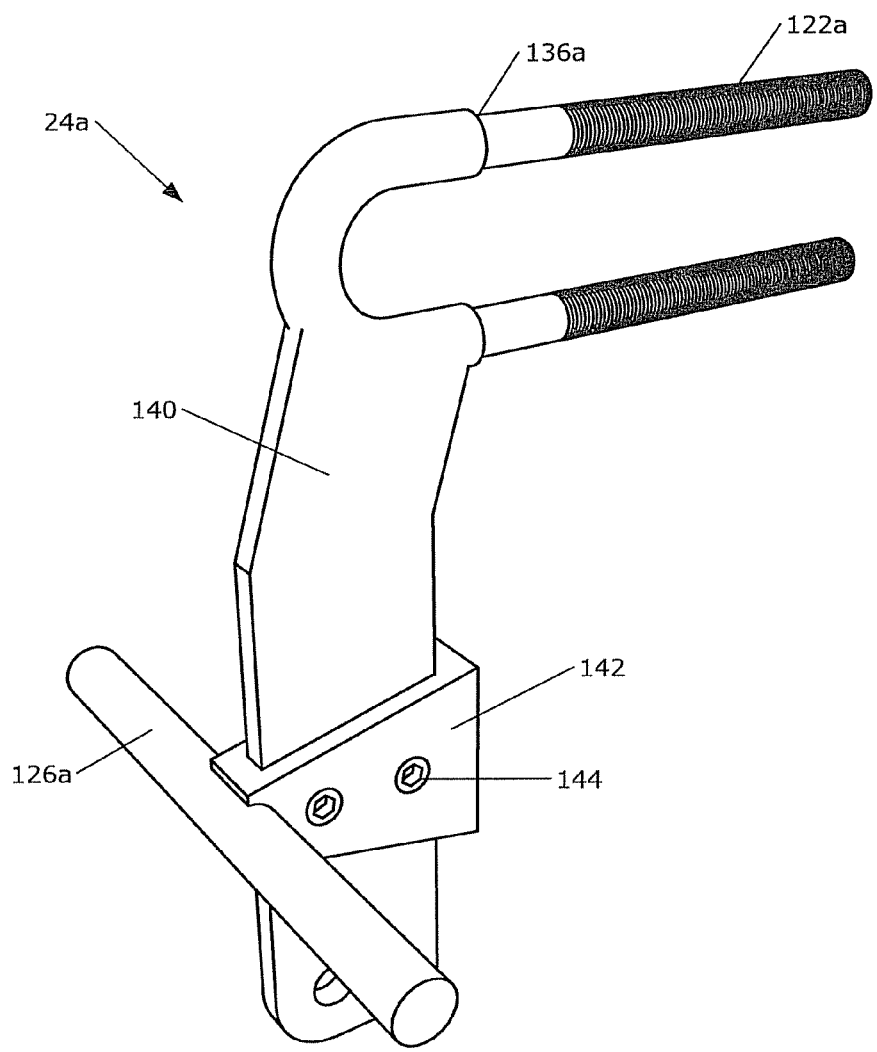
FIG. 6 is a perspective view of a boat coupling part according to a second embodiment.

The boat coupling part 24 may take various forms, two of which are shown in FIGS. 5 and 6. FIG. 5 shows a first embodiment having a U-shaped member 120 with threaded legs 122 interconnected by a semicircular intermediate part 124. The semicircular intermediate part 124 is of circular cross-section of somewhat greater diameter than the circular cross-section of the legs 122, so as to define transversely aligned inward steps 136 where the legs 122 join the intermediate part 124. A retaining element in the form of a cross-piece 126 is secured to the U-shaped member 120 at an intermediate outer location on intermediate part 124, so as to extend transversely to the median plane of the U-shaped member 120 and to either side of the U-shaped member.

FIG. 6 illustrates a second embodiment of the boat coupling part 24a. In common with the first embodiment, the second embodiment 24a includes a U-shaped member 120a with threaded legs 122a interconnected by a semicircular intermediate part 124a and steps 136a where the legs join the intermediate part. In contrast the cross-piece 126a is secured to a .cross-piece carriage 142 which can move up and down a vertically elongate boat coupling part body 140, thereby allowing vertical adjustment of the cross-piece. The cross-piece carriage is secured in position by grub screws 144.

FIG. 4 illustrates a method of attaching the boat coupling part 24 to the boat 10. Particularly the legs 122 are shown passing from the outside of the boat through openings in a front mounting plate 128, and thence through aligned openings in a front wall 130 of the boat 10 and through aligned openings in a rear mounting plate 132 at the back of the wall so that the threaded ends legs extend rearwardly from the wall and rear mounting plate. Nuts 134 threadedly engaged on the legs 122 are tightened so that the front mounting plate 128 is tightly secured between the steps 136 of the U-shaped member 120 and the front of the front wall 130, and the rear mounting plate 132 is tightly secured between the back of the front wall 130 and the nuts. As shown, the boat coupling part 24 is positioned such that the median plane of the U-shaped member 120 is vertical and the cross-piece 126 horizontal, being positioned on the U-shaped member a short distance in front of the boat.

In the latched condition of the latching device 50, shown in FIG. 1, the boat coupling part 24 is captured by latching element 54 in the manner shown in more detail in FIG. 4, That is, the cross-piece 126 is located in the hook formations 88 defined by the upper parts 96 of the latching portion 74 and the respective adjacent and co-joined end parts 76 of leg portions 70, with the intermediate part 124 of the U-shaped member 120 being located, in the side-to-side direction, between the end parts. Rearwards movement of the boat 10 is prevented by this engagement between the boat coupling part 24 and the latching device 50. For example sliding off of the boat from the trailer 12, when in the sloping condition shown in FIG. 1, is prevented. In this condition, too, the position of the weight 110 is not generally important, since pivoting of the latching element 54 is largely precluded, by virtue of the weight of the boat tending to pull the boat rearwardly off of the trailer, so that the boat coupling part 24 rearwardly pulls on the latching element.

Figure 7A:
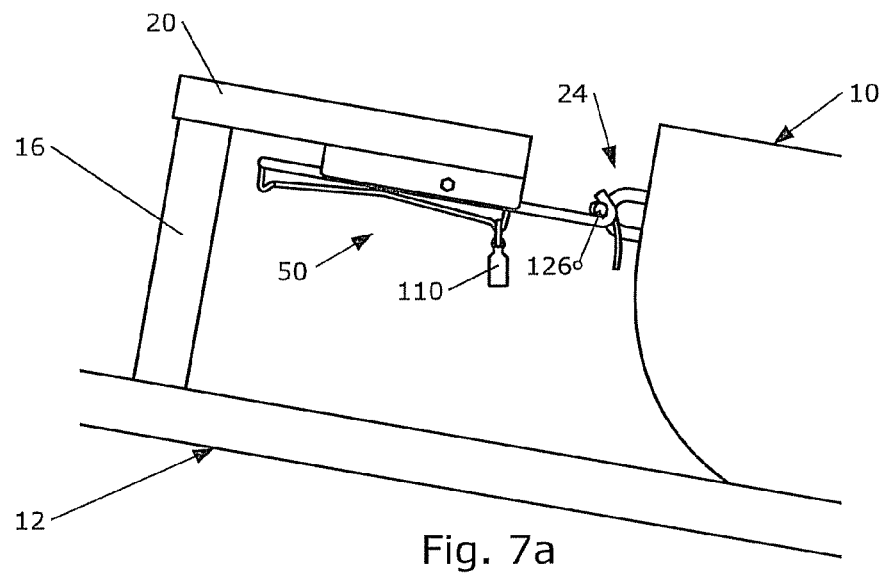
FIGS. 7*a*, 7*b* and 7*c* are fragmentary side views of the trailer, boat and latching device of FIG. 1, illustrating steps in releasing the boat from the trailer and launching the boat from the trailer.

From the condition shown in FIG. 1, steps in launching the boat 10 onto the body of water 28 are now described with reference to FIGS. 7a to 7c. Of these Figures, FIG. 7a illustrates in more detail the condition of the boat and the latching device 50 as shown in FIG. 1. Subsequent to this, with weight 110 at the rearward end of the latching element 54, at hook portion 104, the boat motor 32 is operated to drive the boat a short distance forwardly on the trailer 12, so that rearward holding exerted through cross-piece 126 at the hook formations 88 is relieved. The forward motion is continued until the cross-piece 126 clears, the upper ends of the upper parts 96 of the latching portions 74 of the latching element 54 and it is no longer captured by hook formations 88 (that is, no longer captured by catch parts 85). Then, as shown in FIG. 8, because of bias applied by the weight 110, the latching element 54 is pivoted clockwise under gravity about the pivot axis 78 so that the upper ends of the upper parts 96 of the latching portions 74 are below the cross-piece 126, so releasing the boat from latching to the trailer. Then, as shown in FIG. 9, the boat motor 32 may be operated to reverse the boat off of the trailer and launch it on the body of water.

Figure 8A:
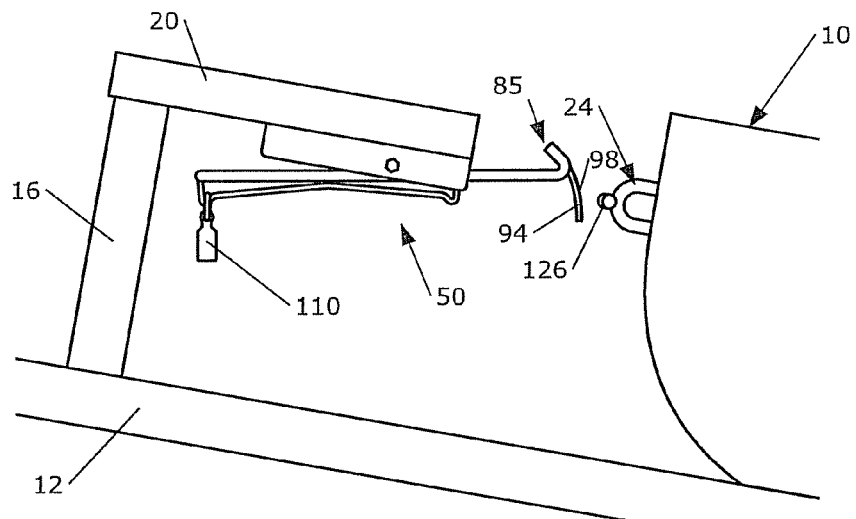
FIGS. 8*a*, 8*b* and 8*c* are fragmentary side views of the trailer, boat and latching device of FIG. 1, illustrating steps in retrieving the boat from the water and latching it to the trailer.
Figure 8B:
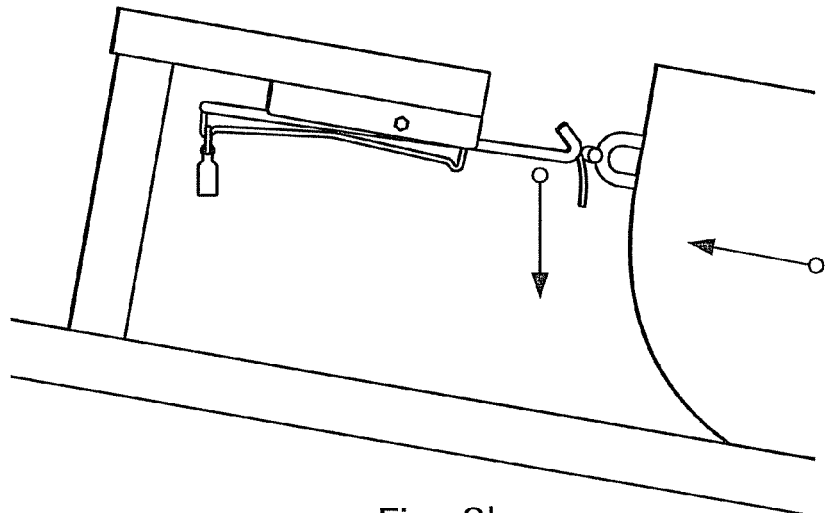
Figure 8C:
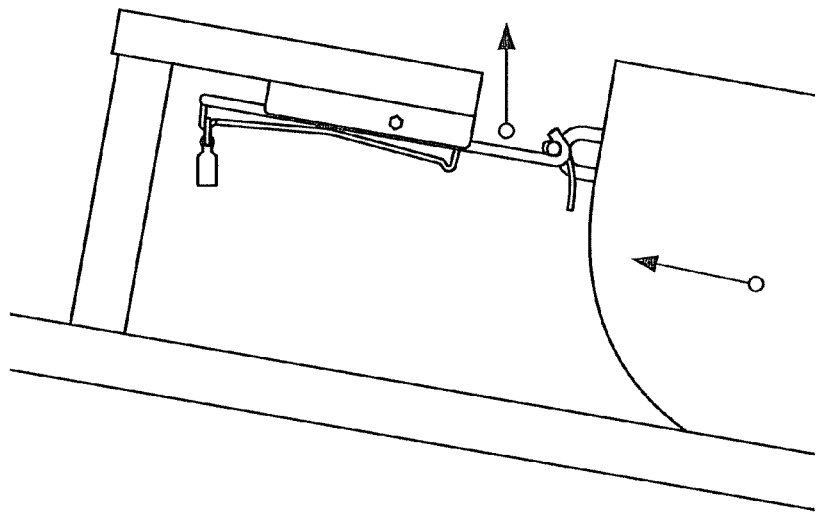
Figure 9A:
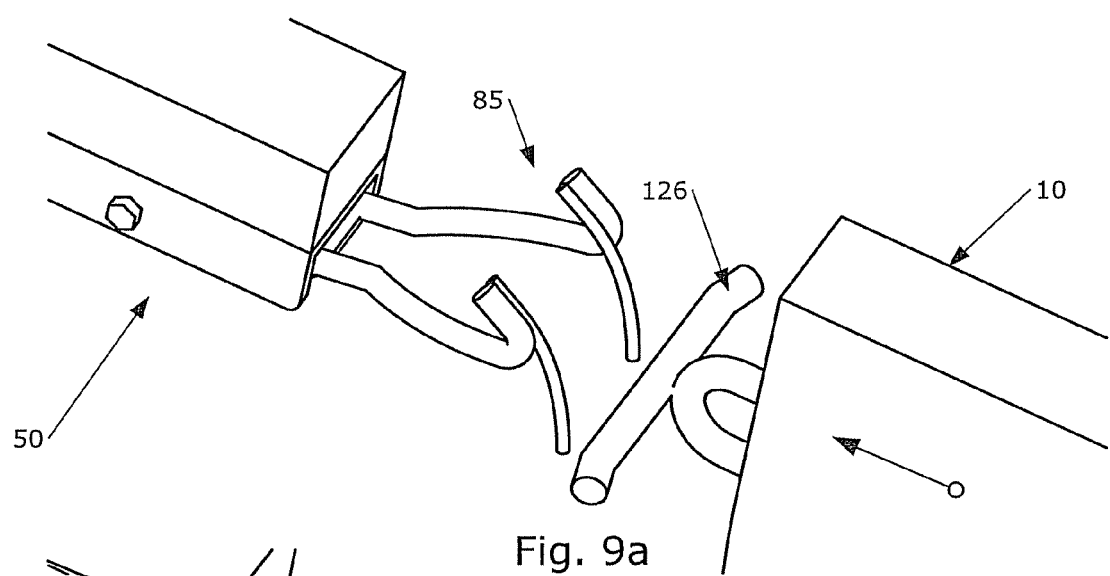
FIGS. 9*a*, 9*b* and 9*c* are fragmentary perspective views illustrating the latching engagement of the latching device and coupling member occurring during execution of the steps illustrated in respective FIGS. 8*a*, 8*b* and 8*c*.
Figure 9B:
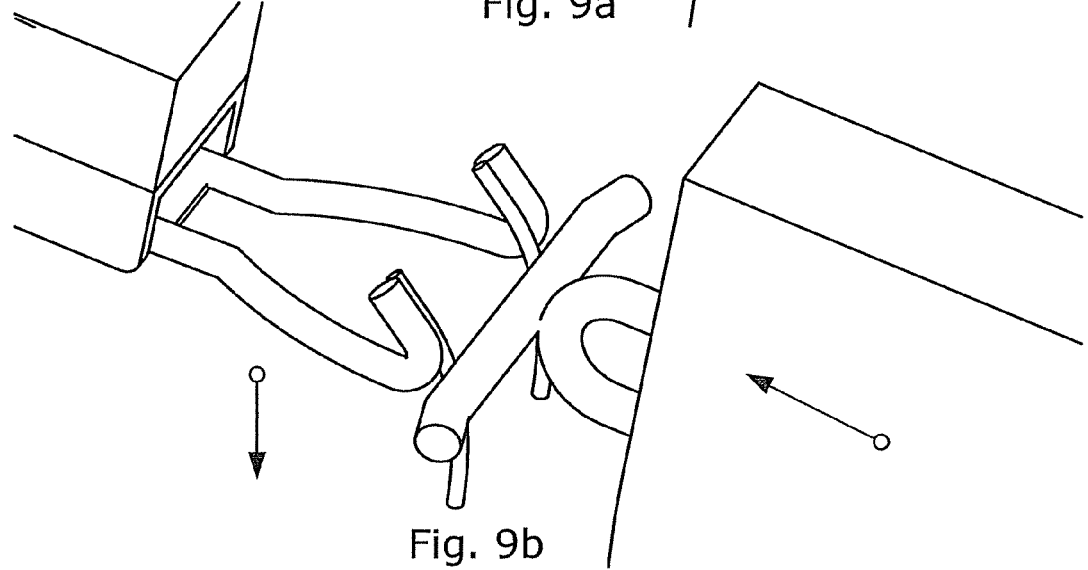
Figure 9C:
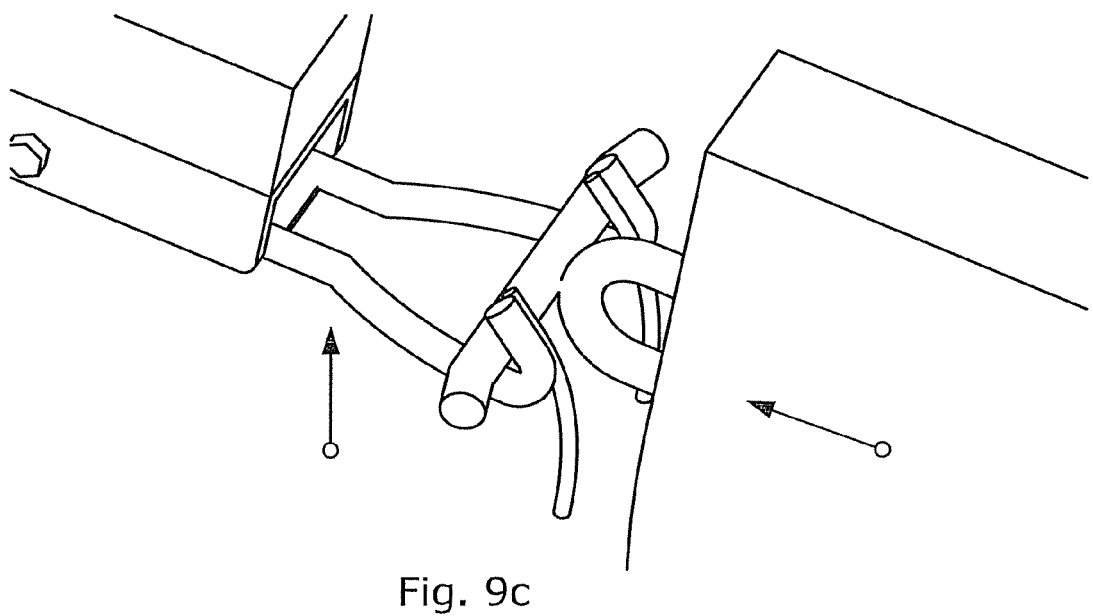

When it is desired to retrieve the boat 10 from the body of water 28, the vehicle 14 and trailer 12 are positioned on the ramp 26 substantially in the condition shown in FIG. 1. The procedure for removing the boat is described with reference to FIGS. 8a to 8c. The boat is driven towards the trailer and aligned for travel up the sloping trailer. With the weight 110 at its forward location on hook portion 102, so that the latching element 54 is pivoted anticlockwise such that the axes of the leg portions 70 are at the position indicated by reference numeral 92 in FIG. 4, the boat is advanced up the trailer (FIG. 8a) until the cross-piece 126 strikes the lower parts 94 of the latching portions 74 such that, under continued motion of the boat, the cross-piece bears against the cam surfaces 98 of the latching portions and by camming action forces the latching portions downwardly causing clockwise pivotal movement of the latching element, until the cross-piece moves over the upper ends of the latching portions, whereupon the latching portions move upwardly by anticlockwise movement of the latching element so that the cross-piece is engaged at its underside with end parts 76 of leg portions 70 of latching element 54. At this condition, the cross piece 126 is situated at a forward location with respect to the hook formations 88 (FIG. 8b). Then, under removal of power to cause forward movement, the boat can slide, or may be made to so slide rearwardly by operation of boat motor 32, until the cross-piece 126 is again captured in the hook formations 88 (FIG. 8c). The vehicle may then be moved forward to carry the boat and trailer with it. The steps illustrated in FIGS. 8a to 8c are also illustrated in respective FIGS. 9a to 9c.

Figure 7B:
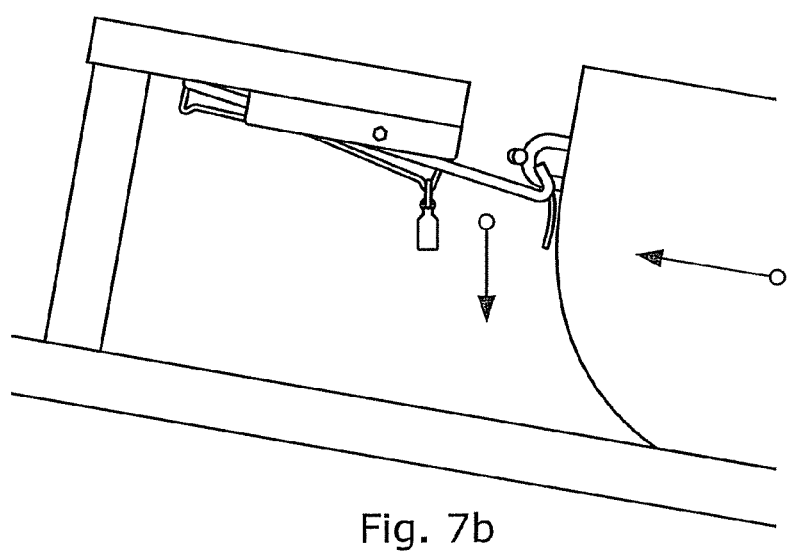
Figure 7C:
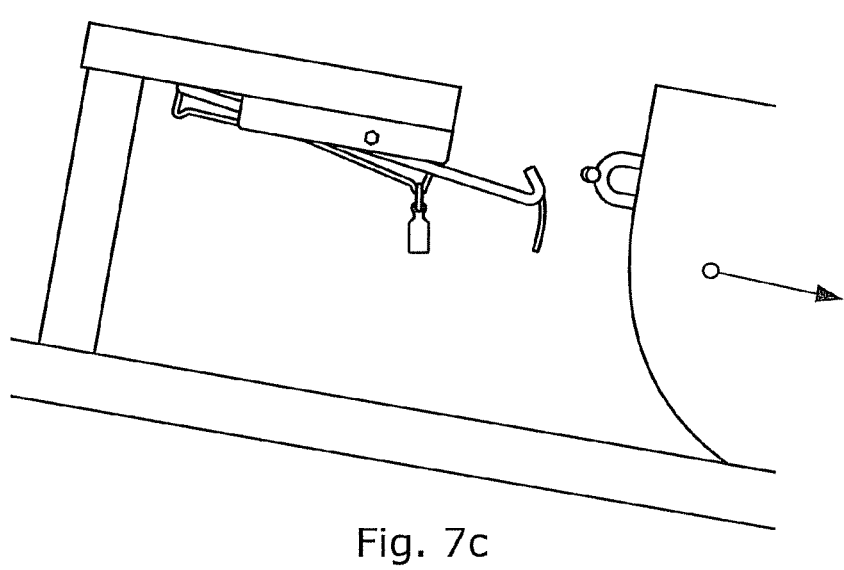

As described, the latching element 54 is pivotal to a first position as shown in FIG. 7a, for capture of the cross-piece 126 by catch parts 85, and to a second position as shown in FIG. 7b, permitting the cross-piece 126 to forwardly pass the catch parts 85. It is generally preferred however that the latching element 54 be pivotal past these positions.

The described construction has been advanced merely by way of example and many modifications and variations may be made without departing from the spirit and scope of the invention, which includes every novel feature and combination of features herein disclosed.

In the preferred embodiment two latching portions 74 engage with the cross piece 126. Many mechanical equivalents such as a single latching portion could achieve a similar result.

In further embodiments the positions of the latching portions and the cross piece could be interchanged, i.e. the latching portion could be on the boat part and the cross piece on the latching device. Similarly the latching device with its biasing means could be attached to the boat and the coupling part could be a trailer coupling part instead.

Mechanical equivalents for the biasing means can also be envisaged such as a pair of selectively engageable springs or a single spring alternating between compression and tension modes.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge.

The invention claimed is:

1. A latching device for latching a boat to a trailer by coupling to a boat coupling part of the boat, wherein the latching device comprises:
   a movable latching element with a catch part; and
   a biasing means operable to bias the latching element towards a first position, and wherein the latching element has a cam surface which, under engagement by forward movement of a laterally extending cross-piece of said boat coupling part there against, is displaced from said first position to a second position permitting the cross-piece to pass the catch part and to be located at an unlatched location, whereafter which the biasing means biases the latching element back towards said first position, and wherein the latching element latches the cross-piece by the catch part under reverse movement of the boat coupling part; and
   a mounting part for attachment to said trailer, wherein said latching element is pivotally mounted to the mounting part; and wherein said biasing means comprises a weight which is movably locatable on the latching element to one of a first location and a second location for selectively biasing the latching element at least to said first position and to said second position under gravitational influence.

2. The latching device as claimed in claim 1, wherein the biasing means is operable to bias the latching element to said second position, whereby the boat, when latched to the trailer, can be released by movement of the boat to move said cross-piece past said catch part to said unlatched location, at which the biasing means moves the latching element to the second position to permit the cross-piece to be freed from the latching element by reverse movement of the boat coupling part.

3. The latching device as claimed in claim 1, the latching element having a slide, the weight being slidably movable along the slide to said one of the first and second locations.

4. The latching device as claimed in claim 3 wherein said first and second locations are at opposite sides of a pivot axis of the latching element such that when the weight is positioned at one of said first and second locations, the latching element is biased for clockwise pivotal movement about said axis and, when the weight is at the other of said first and second locations, the latching element is biased for anticlockwise pivotal movement about said axis.

5. The latching device as claimed in claim 1 wherein said catch part is in the form of a hook formation, for capturing the laterally extending cross-piece of said boat coupling part.

6. In combination, a latching device and a boat coupling part attachable to a boat, wherein the latching device is for latching the boat to a trailer by coupling to the boat coupling part of the boat, and the latching device has a movable latching element with a catch part, and biasing means operable to bias the latching element towards a first position, the latching element having a cam surface which, under engagement by forward movement of a laterally extending cross-piece of said boat coupling part thereagainst, is displaced from said first position to a second position permitting the cross-piece to pass the catch part to be located at an unlatched location, whereafter which the biasing means biases the latching element back towards said first position, and the latching device latches the cross-piece by the catch part under reverse movement of the boat coupling part; and wherein said boat coupling part comprises a vertically elongate body and the cross-piece is attached to a carriage wherein the carriage can be moved vertically along said body.

* * * * *